US012812263B2

(12) United States Patent
Mascarenas et al.

(10) Patent No.: US 12,812,263 B2
(45) Date of Patent: Nov. 24, 2026

(54) METHOD AND SYSTEM FOR MODIFYING EXPOSURE TIME AND APERTURE OF AN IMAGE IN POST-PROCESSING

(71) Applicant: TRIAD National Security, LLC, Los Alamos, NM (US)

(72) Inventors: David Dennis Lee Mascarenas, Los Alamos, NM (US); Andre Walter Green, Los Alamos, NM (US); Alessandro Cattaneo, Los Alamos, NM (US); Moises Felipe Mello Da Silva, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 19/303,066

(22) Filed: Aug. 18, 2025

(65) Prior Publication Data

US 2026/0052320 A1 Feb. 19, 2026

Related U.S. Application Data

(60) Provisional application No. 63/684,672, filed on Aug. 19, 2024.

(51) Int. Cl.

| | |
|---|---|
| ***H04N 25/47*** | (2023.01) |
| ***H04N 23/957*** | (2023.01) |
| ***H04N 25/533*** | (2023.01) |
| ***H04N 25/704*** | (2023.01) |

(52) U.S. Cl.

CPC ........... *H04N 25/47* (2023.01); *H04N 23/957* (2023.01); *H04N 25/533* (2023.01); *H04N 25/704* (2023.01)

(58) Field of Classification Search

CPC .................................................... H04N 23/957

See application file for complete search history.

(56) References Cited

U.S. PATENT DOCUMENTS

| | | | | |
|---|---|---|---|---|
| 2025/0039568 | A1 * | 1/2025 | Gupta | H04N 25/773 |
| 2025/0386085 | A1 * | 12/2025 | Brady | H04N 23/45 |

OTHER PUBLICATIONS

Habuchi et al.; "Time-Efficient Light-Field Acquisition Using Coded Aperture and Events"; Mar. 12, 2024; ARXIV Id: 2403.07244v1; pp. 1-11 (Year: 2024).*

* cited by examiner

*Primary Examiner* — Cynthia Calderon

(57) ABSTRACT

A method includes collecting light associated with an object using a plurality of lenses positioned in an array to provide angular and light intensity data associated with features within the object. The light from the object forms an image on a plurality of pixels. The method includes collecting event-based data associated with the object. The event-based data is associated with changes associated with the light from the object over time on a per pixel basis. The method also includes applying a digital coded exposure to the event-based data to generate a response data. Applying the digital coded exposure is based on a function that modifies one exposure time associated with a subset of pixels from the plurality of pixels of the image. The method includes applying digital refocusing to the response data to modify a depth-in-field associated with some pixels of the plurality of pixels.

26 Claims, 16 Drawing Sheets
(13 of 16 Drawing Sheet(s) Filed in Color)

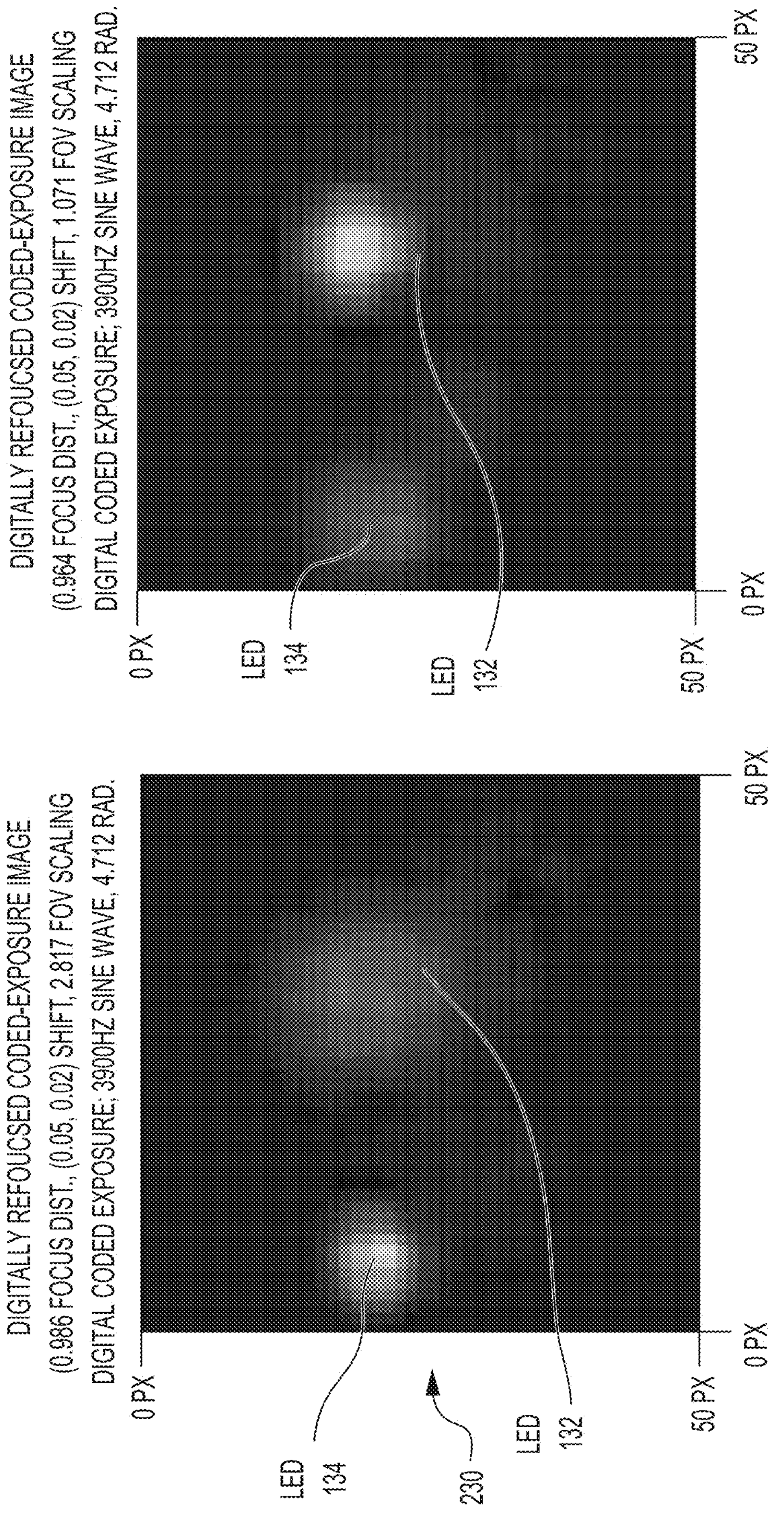
FIG. 2B (CONT. 1)

METHOD AND SYSTEM FOR MODIFYING EXPOSURE TIME AND APERTURE OF AN IMAGE IN POST-PROCESSING

RELATED APPLICATIONS

The instant application is a Nonprovisional U.S. Application that claims the benefit and priority to the Provisional Application No. 63/684,672, filed on Aug. 19, 2024, which is incorporated herein by reference in its entirety.

ACKNOWLEDGMENT OF GOVERNMENT SUPPORT

This invention was made with government support under Department of Commerce ECCN 6E001 awarded by the U.S. Department of Energy. The government has certain rights in the invention.

BACKGROUND

In general, the quality and nature of images captured using traditional photography techniques, e.g., pinhole model, depends on the aperture diameter, exposure time, and ISO. The brightness, the focus, and noise in an image is controlled by varying the aperture diameter, exposure time, and ISO (sensitivity to light). In conventional photography these parameters are set before capturing the image and cannot be changed once the image is captured, requiring expertise by the photographer. Parameters that are not optimized may result in the generation of an image that is over/under exposed, grainy, or out-of-focus.

Some attempts have been made to change at least one of the three factors (i.e., aperture diameter, exposure time, and ISO) after the image is captured. For example, some conventional light field imager systems have been developed to refocus images and change the plane-of-focus after the image is captured, i.e., post-processing. Unfortunately, light field imagers are very memory intensive (requiring a much larger memory space) in comparison to conventional imagers, thereby making them costly to use especially in certain applications such as light field data collected at high framerates.

Additional efforts have been made to address motion deblurring when the image is being captured. For example, flutter shutter is a hardware that was developed and added to a camera that open/close the shutter in pseudorandom binary manner at a speed faster than the total exposure time associated with formation of a frame. Performing the pseudorandom modulation of the shutter reduces the impact of zeros in the frequency domain associated with a boxcar shutter function that could otherwise make unambiguous reconstruction of signals difficult if not impossible and cause ringing artifacts when trying to remove motion blur. Unfortunately, flutter shutter and other methodology have been limited to hardware and incapable of being applied in post-processing (after the image is captured).

BRIEF DESCRIPTION OF THE DRAWINGS

The patent or application file contains at least one drawing executed in color. Copies of this patent or patent application publication with color drawing(s) will be provided by the Office upon request and payment of the necessary fee. Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
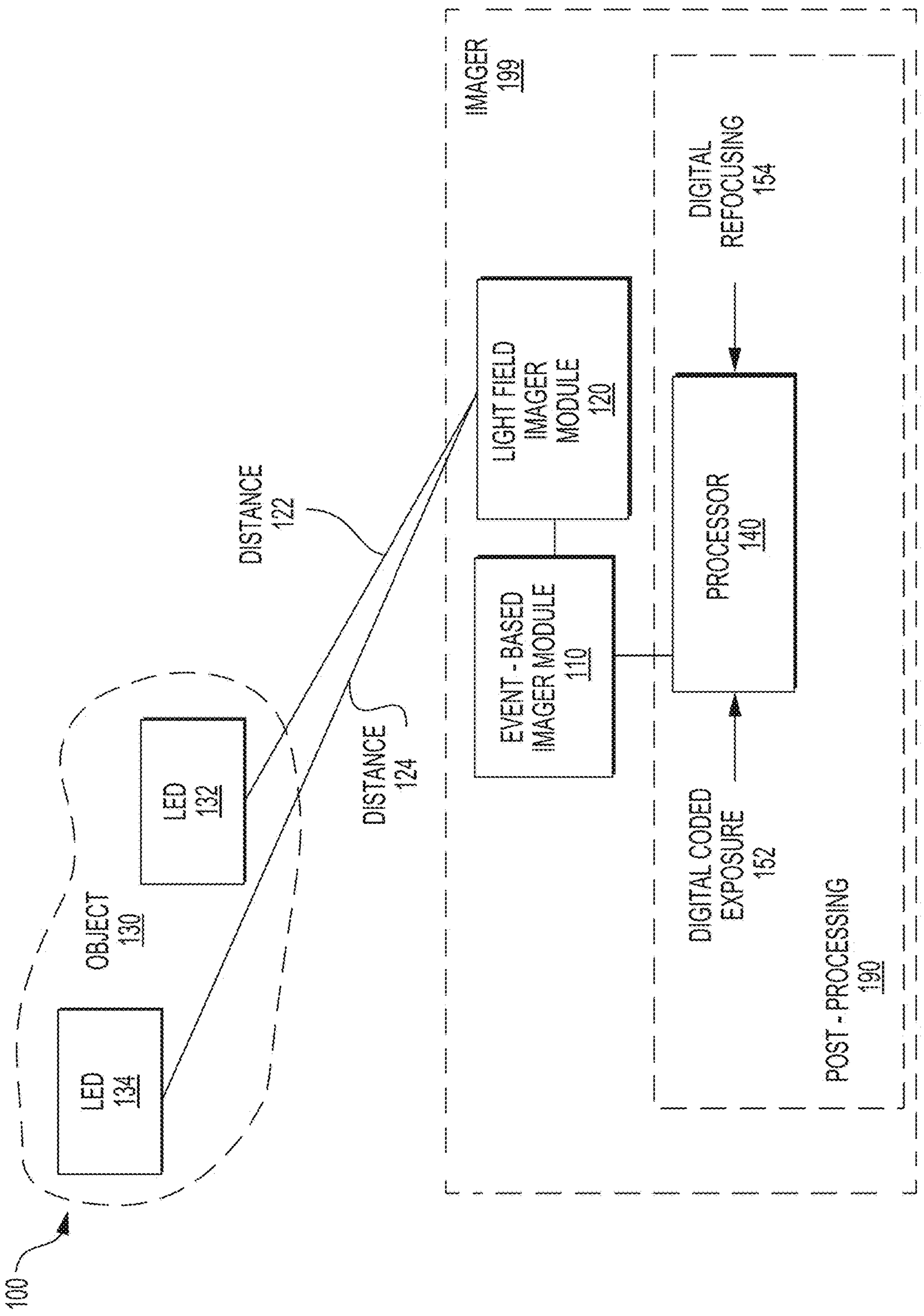
FIG. 1 depicts an example of a system 100 diagram configured to modify plane-of-focus and exposure time/function in post-processing according to one aspect of the present embodiments

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing certain concepts, and the terminology is not intended to be limiting. Unless defined otherwise, all technical and scientific terms used herein have the same meaning as commonly understood in the art to which the embodiments pertain.

Accordingly, a need has arisen to enable the exposure time/function associated with a captured light associated with an object to be modified in post-processing (after the image has been formed). It is appreciated that exposure function may be a function that changes/modifies the exposure characteristic, e.g., exposure time. Moreover, a need has arisen to enable an imager (e.g., plenoptic camera, integral photography imager, etc.) to refocus a captured image to be changed in post-processing (after the image has been captured) without incurring costs associated with memory usage of the conventional methodology (e.g., by reducing the amount of memory that is needed to modify and change the plane-of-focus/light intensity).

According to some embodiments, an integral photography imager that includes a light field imager module may be coupled to an event-based imager module. Light reflected off of an object is captured by an imager equipped with light field image module such as an integral photography imager or plenoptic camera (e.g., a three-dimensional imaging that captures and reproduces a light field by using a two-dimensional array of microlenses or a spatially distributed array of imagers, or a moving imager). It is appreciated the light may be recorded/measured using an event-based imager module. The event imager module is configured to capture changes associated with an image over time, e.g., changes to brightness of the captured light of the image, changes to the position of the image, changes to the captured color of the image, changes to the modulated frequency of light reflecting of off the image, etc. It is appreciated that discussions with respect to use of an event-based imager module are for illustrative purposes and should not be construed as limiting the scope of the embodiments. For example, other modules capable of capturing time-based events, e.g., time stamped, may similarly be used. For example, a photon counting imager may be used. Since the integral photography imager is equipped with the event-based imager, the amount of data that needs to be collected by the light field imager is reduced by allowing the event-based imager to capture the changes over time. As such, the plane-of-focus (field) may now be modified in post-processing without being memory-intensive, thereby making it less costly from the memory usage standpoint and from the processing cost standpoint.

Additionally, the event-based image module that captures the changes associated with the captured light of an object over time is used along with a digital coded exposure. The digital coded exposure applies an exposure versus time function to the captured light to control the exposure time/function. In other words, the digital coded exposure is a function (e.g., any functional form not limited to binary pulse trains, complex values, negative values, positive values, real values, floating point values, etc.) that can be applied in post-processing to the captured light associated with an object and data captured by the event-based imager to modify the exposure time/function of the image, on a per-pixel basis, to form a modified image or frame.

Accordingly, not only the plane-of-focus of the image can now be changed in post-processing without it being the memory-intensive, the exposure time/function associated with a captured light of an object can also be modified in post-processing. Moreover, application of digital coded exposure enables multiple images to be formed with different blur characteristics from the same set of data (e.g., data captured by the event-based imager and also light field imager). It is appreciated that the digital coded exposure may also be used in capturing fast phenomena with reduced memory requirements in comparison to the conventional imagery that requires a lot more memory space. It is further appreciated that the digital coded exposure coupled with event-based imager module also results in high dynamic ranges, e.g., 90-120 dB, with lower power consumption in comparison to imagers with framerates capable of capturing similar phenomena without aliasing. High dynamic ranges refer to adequately capturing features (dark features and light features) of the image from the same captured image to enable one to distinguish both features from the same image even though the features have very different characteristics (one being very dark and one being very light).

FIG. 1 depicts an example of a system 100 diagram configured to modify plane-of-focus and exposure time/function in post-processing according to one aspect of the present embodiments. System 100 includes an imager 199, e.g., neuromorphic camera, integral photography imager, plenoptic camera, etc., with event-based imager module 110 and a light field imager module 120. The imager 199 may also include a processor 140 configured to modify and change the plane-of-focus and/or the exposure time/function in post-processing 190. Post-processing refers to processing of the image after it has been captured/recorded.

It is appreciated that a light field imager module 120 may use light intensity and angular information associated with an object 130. For example, the light field imager module 120 may include multiple lenses such as microlens array to capture various light intensity and angular information associated with the object 130. In some nonlimiting examples, a spatially distributed imager array may be used or in other examples a moving imager may be used to capture light intensity and angular information associated with light coming from an object 130.

It is also appreciated that the event-based imager module 110 is configured to record changes with respect to the image over time (e.g., timestamped information reflecting changes over time) and do not alias unlike other types of imagers. It is further appreciated that the event-based imager module 110 unlike conventional cameras does not have a frame-rate or shutter and as a result each event captured by the event-based imager module 110 is associated with a cluster of photons that interacts with the pixels. Changes may include changes with respect to position of a feature within an image, change in brightness/intensity, change in color, changes in frequency, etc., on a per pixel basis. In other words, the event-based imager module 110 captures a time that an event has occurred, location of a pixel associated with that event, and the polarity of the intensity change, as an example. It is appreciated that event driven imagery allows arbitrary virtual digital shutter function to form a final frame of an image on a pixel-by-pixel basis. As such, spatio-temporal information within a captured image (light associated with an object) may be controlled in post-processing 190.

For illustration purposes that should not be construed as limiting the scope of the embodiments, the object 130 includes two light emitting diodes (LEDs) 132 and 134 and their respective emitted lights are captured by the imager 199.

In this nonlimiting example, the event-based imager module 110 is positioned to be one focal length away from the light field imager module 120. LEDs 132 and 134 may be positioned at a particular distance away from one another. In this nonlimiting example, LED 132 is at a distance 122 away from the light field imager module 120 and the LED 134 is at a distance 124 away from the light field imager module 120 (e.g., from the center of the micro-lens array). For illustration purposes, LED 132 may blink sinusoidally at a given frequency, e.g., 3.9 kHz, and LED 134 may blink sinusoidally at a different frequency, e.g., 1.9 kHz. It is appreciated that the blinking of the LEDs is to illustrate a change, e.g., brightness, over time and discussions with respect to particular frequencies and shape (sinusoidal) are for illustration purposes and should not be construed as limiting the scope of the embodiments. For example, a non-sinusoidal or changes in color or changes in position of a feature within the image may be captured. The use of the light field imager module 120 and event-based imager module 110 along with the processor 140 that applies digital refocusing 154 and digital coded exposure 152 enables the LEDs 132 and 134 to be separated by distance and for their exposure time/function to be adjusted in post-processing 190 as described below.

The light field imager module 120 is configured to capture the light associated with the object 130 including the LEDs 132 and 134 using its microlens array. As such, various information such as light intensity and angle can be processed to adjust the plane-of-focus in post-processing 190. The event-based imager module 110 is configured to receive data from the light field imager module 120. The event-based imager module 110 is configured to record the changes over time. For example, the event-based imager module 110 may record changes in brightness over time, changes in color over time, changes in positioning of certain features over time, changes in frequency over time, etc. In this nonlimiting example and for illustration purposes, the event-based imager module 110 records on/off aspect of the LEDs 132 and 134 over time that occurs at different frequencies.

Figure 2A:
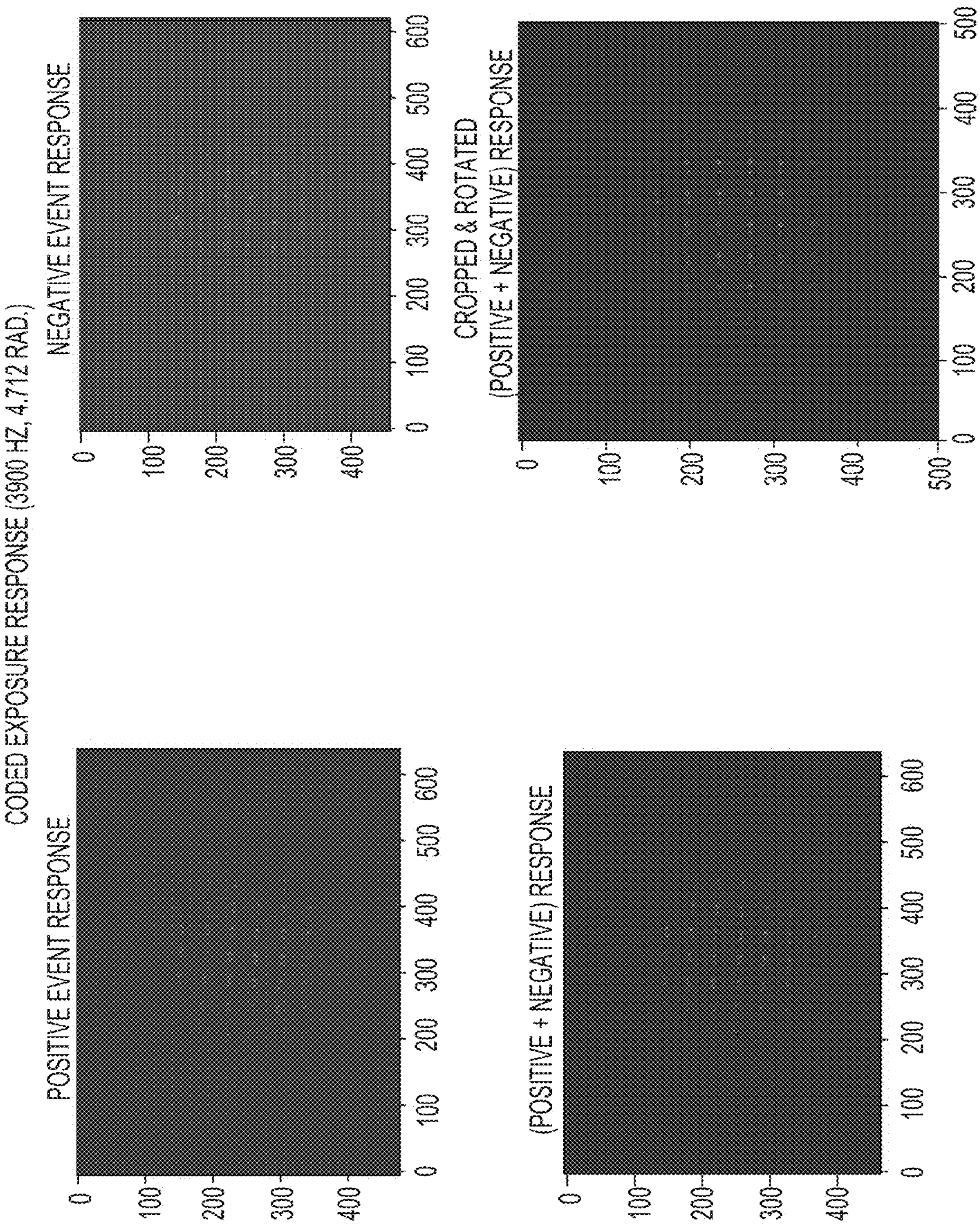
FIG. 2A depicts an example of a response to application of a digital coded exposure according to one aspect of the present embodiments.

The processor 140, e.g., a central processing unit, may apply the digital coded exposure 152 to the data captured by the event-based imager module 110. Digital coded exposure is described in more detail in FIGS. 3A-3B below. In this nonlimiting example, the digital coded exposure 152 may be a function. For example, one sinusoidal function with a frequency of 3.9 kHz may be applied to the data captured by the event-based imager module 110 and the light field imager module 120 to isolate the data associated with LED 132 that blinks at 3.9 kHz such that modifications can be made to its exposure time/function, as shown in FIG. 2A. The positive and the negative event responses are shown. It is appreciated that the positive and negative responses are summed, as illustrated, and may be rotated, e.g., 3 degrees, to account for physical misalignment of the sensor and the micro-lens array. Similarly, another sinusoidal function with a frequency of 1.9 kHz may be applied to the data recorded by the event-based imager module 110 and the light field imager module 120 to isolate the data associated with LED 134 that blinks at 1.9 kHz such that modifications can be made to its exposure time/function. It is appreciated that the positive and the negative event responses for the LED 134 may also be captured, summed and rotated (not shown).

Figure 2B:
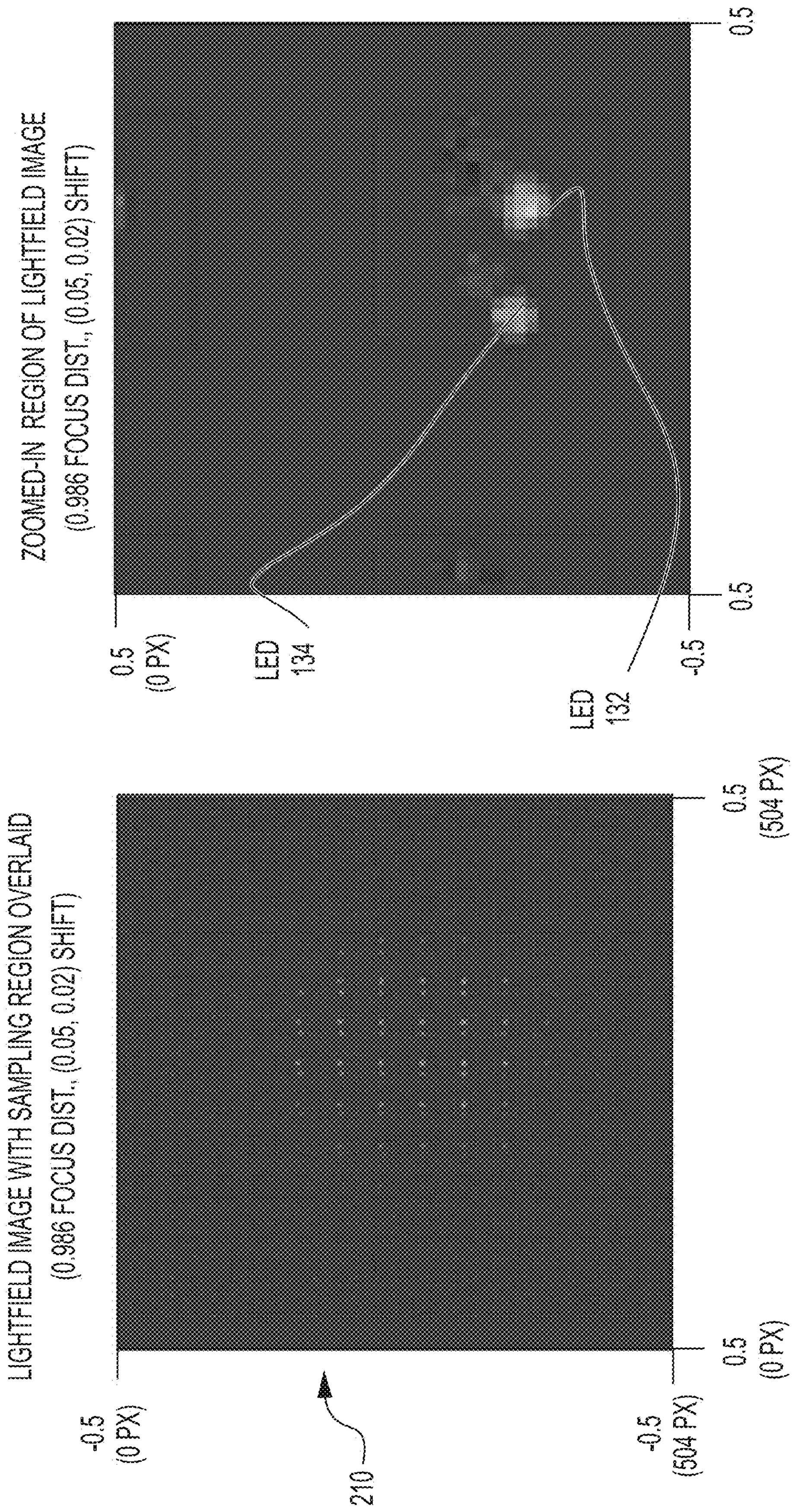
FIG. 2B depicts an example of sampling of the light field image at a distance according to one aspect of the present embodiments.
Figure 2B:
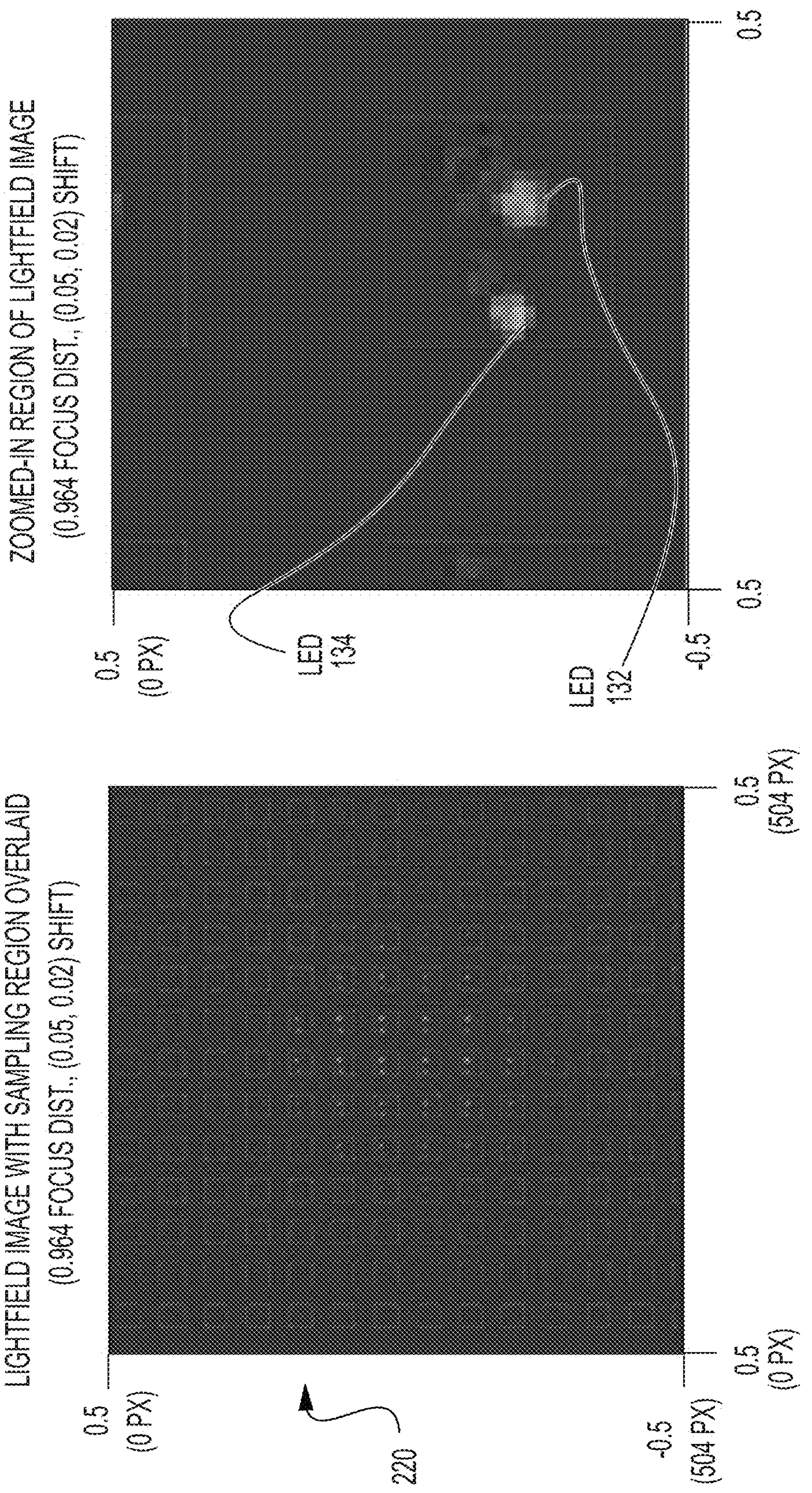

It is appreciated that applying the digital coded exposure 152 isolates the features of interest, therefore reducing the amount of memory associated with refocusing (plane-of-focus) for the light field imager module 120. Digitally refocusing 154 algorithm, e.g., back-propagation algorithm (described in greater detail in FIGS. 4A-4C), may now be applied to the responses associated with LEDs 132 and 134 with various focus ratios, e.g., 0.986 and 0.964, to focus on the further LED 134 (at distance 124) and the closer LED 132 (at distance 122) respectively. Referring now to FIG. 2B, row 210 illustrates the light field image sampled at a far distance (distance 124) while row 220 illustrates the light field image sampled at a near distance (distance 122). Row 230 illustrates the summing of the sampled regions of rows 210 and 220 to focus on the closer and further LEDs 132 and 134 respectively.

Figure 2C:
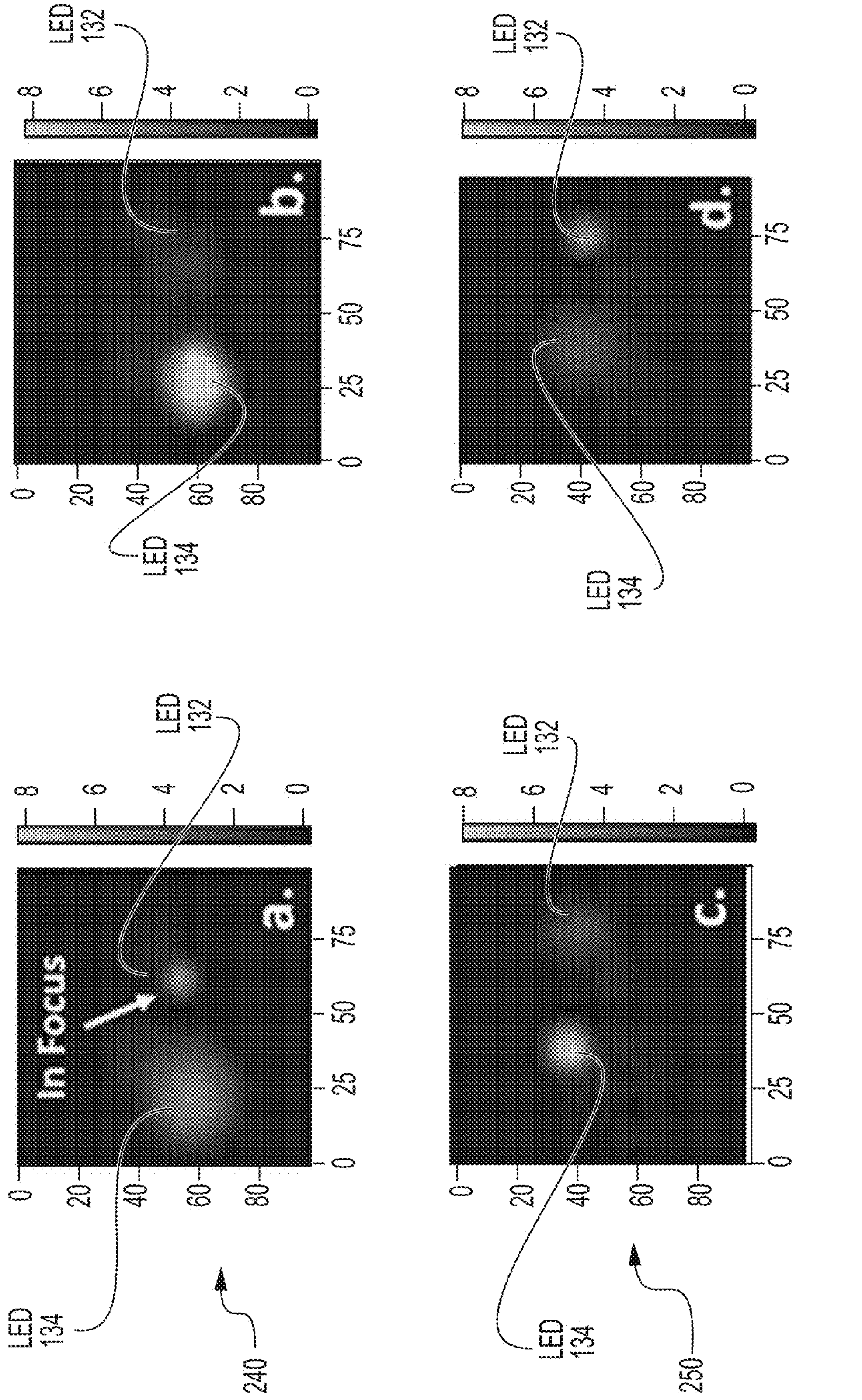
FIG. 2C depicts an example of isolation/refocusing for a feature within an image by applying the digital coded exposure and digitally refocusing algorithm according to one aspect of the present embodiments.
Figure 2D:
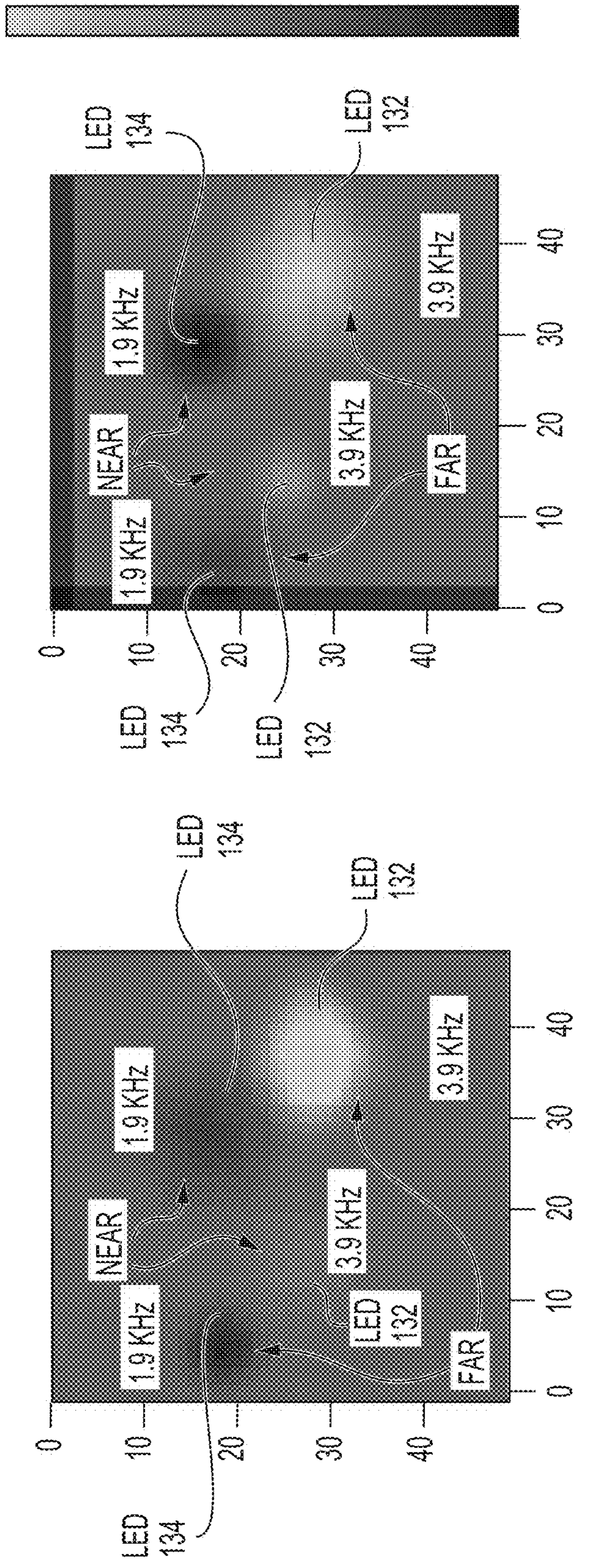
FIG. 2D depicts an example of composite of digital coded exposures with different focusing according to one aspect of the present embodiments.

Referring now to FIG. 2C, isolation/refocusing for each LED 132 and 134 using the digital coded exposure 152 and digitally refocusing 154 algorithm is shown. Row 250 is associated with digital coded exposure 152 where the sinusoidal function at 3.9 kHz has been applied while row 240 is associated with digital coded exposure 152 where the sinusoidal function at 1.9 kHz has been applied. Referring now to FIG. 2D, two composite digital coded exposures (at 3.9 kHz and 1.9 kHz) at the two focusing ratios 0.986 and 0.964 are shown for illustration purposes. It is appreciated that in one nonlimiting example, one digital coded exposure, e.g., function at 1.9 kHz, may be offset relative to the actual phase of the LED 134 in order to produce a strong negative response whereas the digital coded exposure, e.g., function at 3.9 kHz, may have a phase that matches the actual phase of the LED 132 to produce a strong positive response. In some embodiments, each digital coded exposure response may be independently normalized to span (−1, 1) and summed together. As illustrated, LED 132 becomes sharper by shifting the focus to the LED 132 (closer LED) while LED 134 becomes blurrier and vice versa. In other words, applying the refocusing algorithm results in changes to the image being formed depending on distance to the object, in post processing. It is appreciated that applying different digital coded exposure (different functions) results in a change in the blur characteristics of the features within an image 130. Thus, exposure time/function associated with different pixels within the image 130 may be changed/modified, in post-processing 190, independent of one another. In other words, different pixels may be subject to different exposure time/function, thus enabling the embodiments to tease out different features within the same image.

The embodiments described above have a wide array of applications including stroboscopic, 3-dimensional applications, health monitoring, vibration monitoring, machinery monitoring, structural dynamic identification, robotics, augmented reality, microscopy, smart phones, image deblurring etc. Moreover, the embodiments may have applications in image processing where features within the image change rapidly and where the embodiments may be utilized to interpolate and forward what an image looks like based on the data received by the event-based imager module 110. It is appreciated that low-latency associated with the event-based imager module 110 makes the embodiments suited for capturing dynamic scenes (e.g., fast moving features within an image).

Figure 2E:
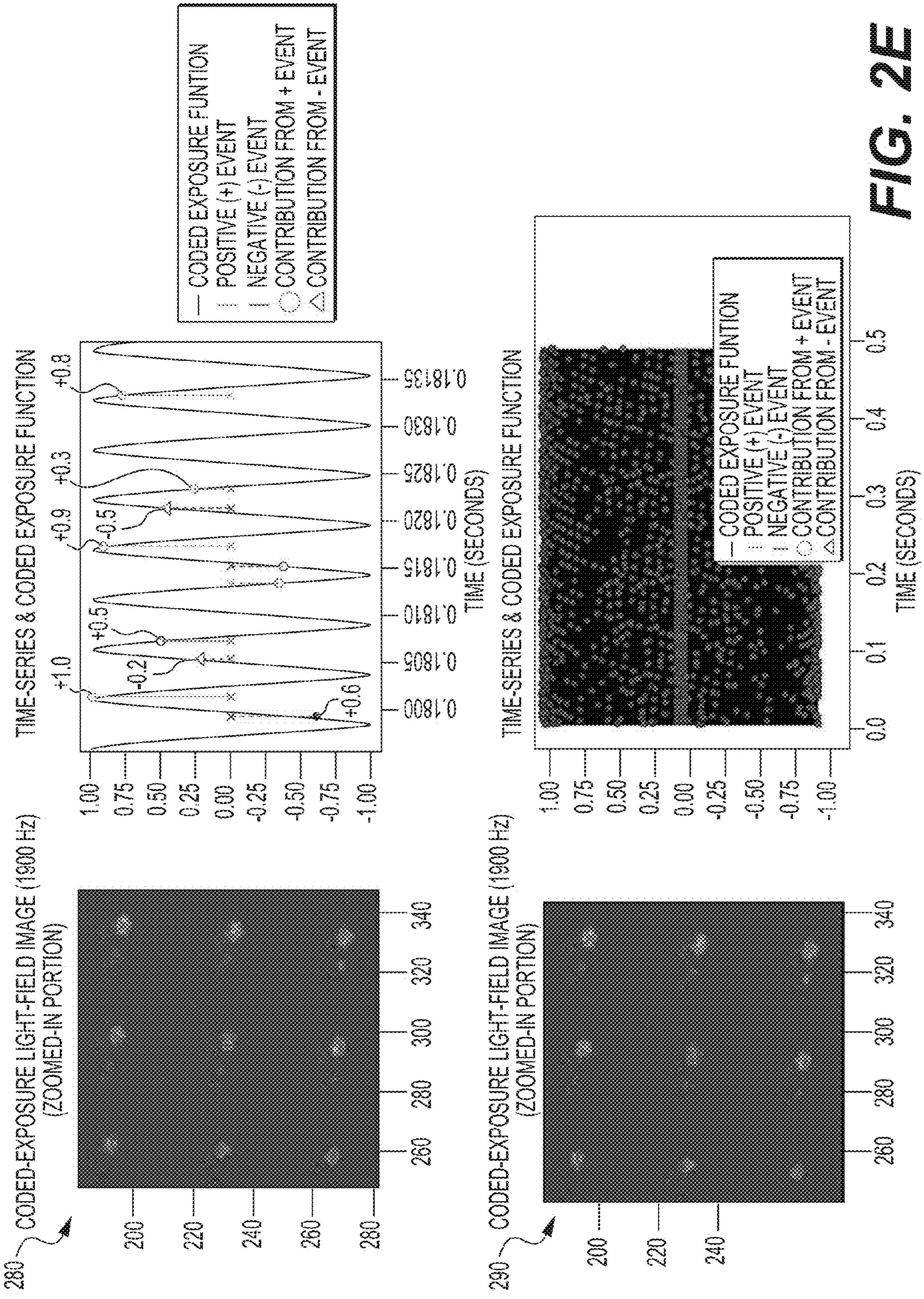
FIG. 2E depicts an example of application of digital coded exposure with a particular function and frequency associated with FIG. 1 according to one aspect of the present embodiments.

Referring now to FIG. 2E, digital coded exposure applied using a 1.9 kHz sinusoid exposure function associated with FIG. 1 is shown for illustration purposes. It is appreciated that at a short time scale, as shown in row 280, a correlation between the received events and the coded exposure function may not be determined. It is further appreciated that running over sufficiently long period, as shown in row 290, correlation between the received events and the coded exposure function is illustrated where positive events occur at the peaks of the sinusoid and the negative events occur at the troughs. It is appreciated that positive events that occur when the exposure function is positive count toward the coded exposure value for a series whereas positive events that occur when the exposure function is negative count against the coded exposure value and vice versa.

Figure 3A:
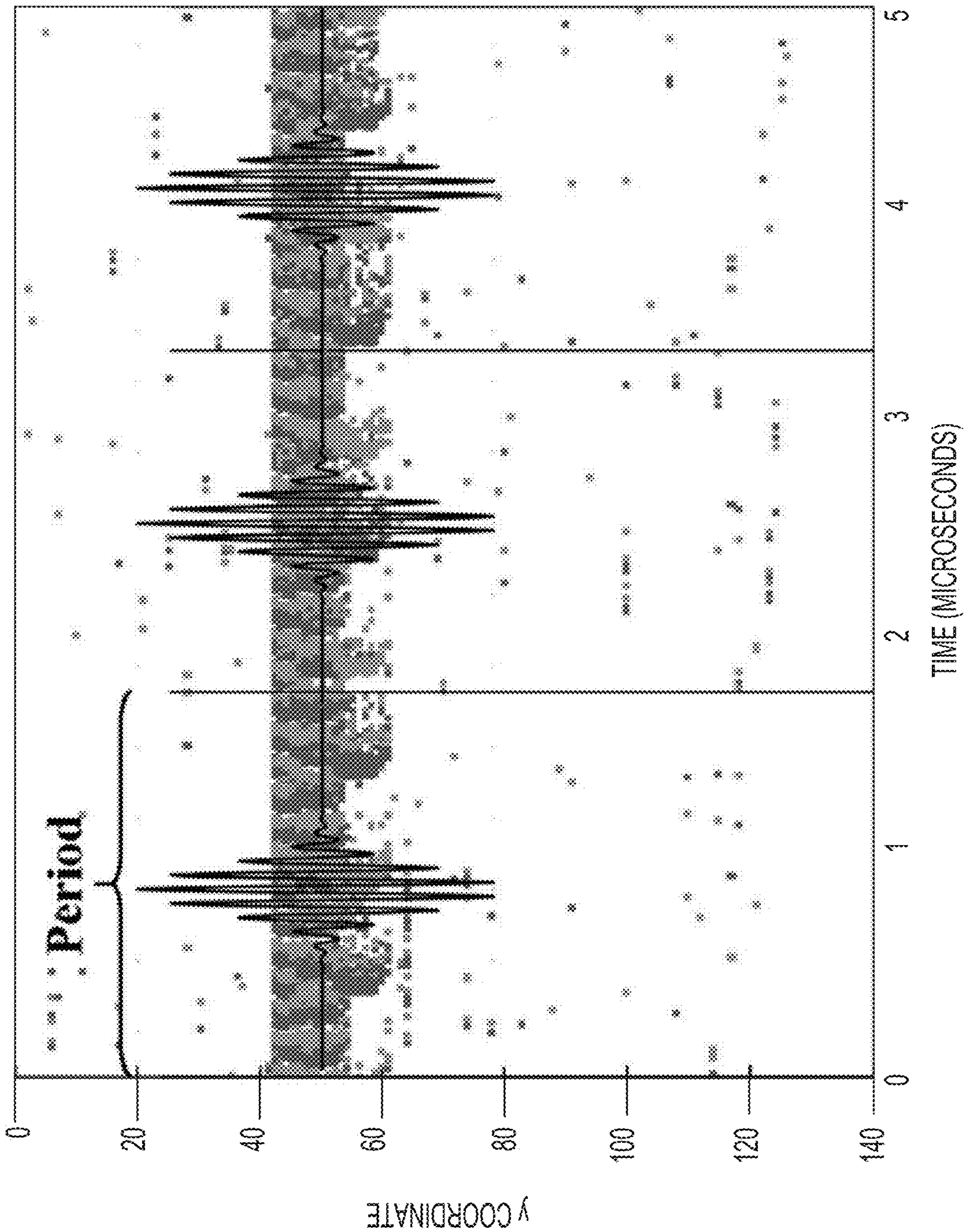
FIGS. 3A-3B depict examples of digital coded exposure according to one aspect of the present embodiments.
Figure 3B:
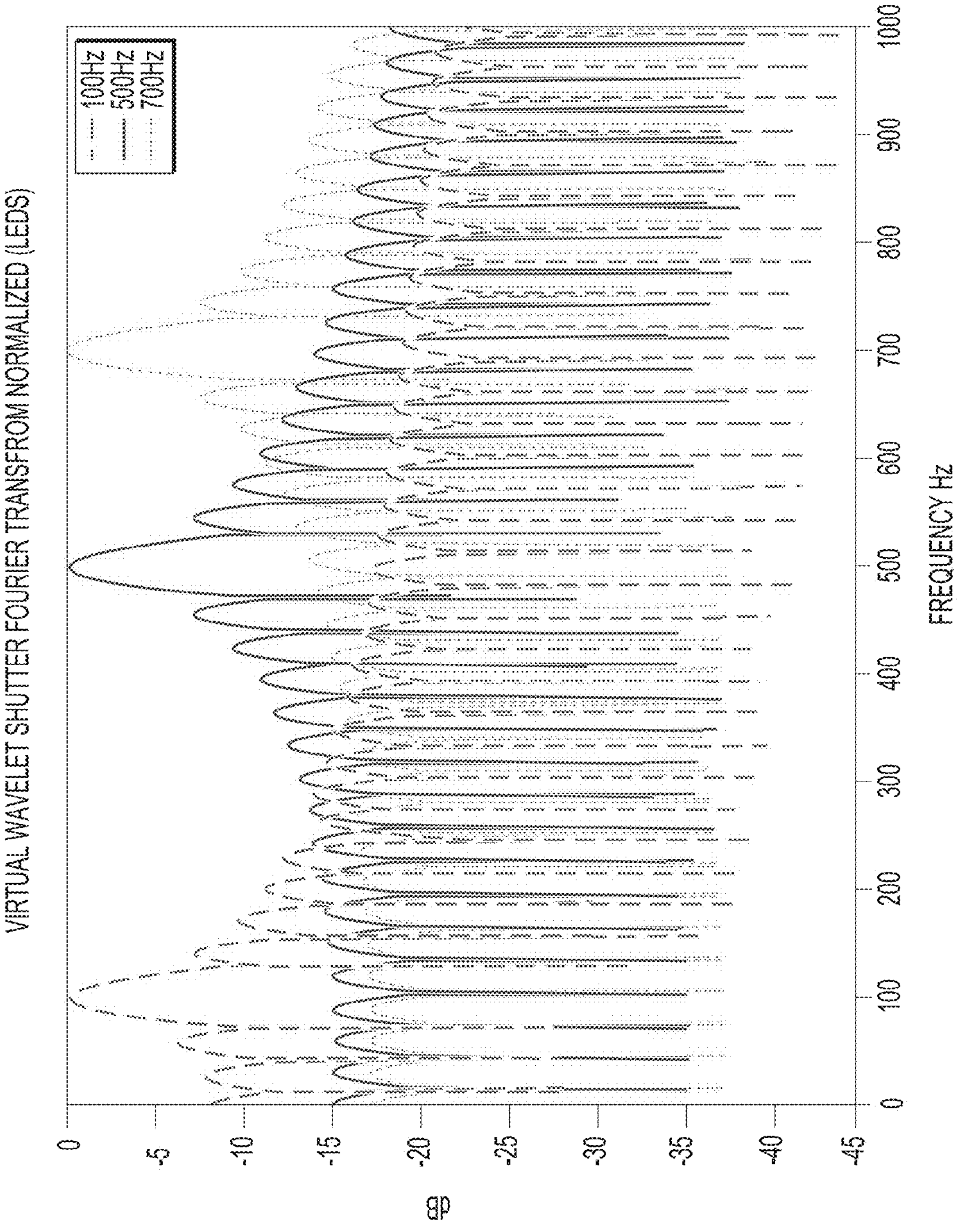

Referring now to FIGS. 3A-3B, examples of digital coded exposure according to some embodiments are shown. In some embodiments, digital coded exposure transforms a time-series of events into a single scalar value. In one nonlimiting example, frames may be formed from event-driven data, as captured by the event-based imager module 110 by adding (summing) all the events for each pixel over a particular period of time. A digital coded exposure 152 comprises an exposure function, a method of summation, and a time-series of events (received from the event-based imager module 110 and the light field imager module 120). It is appreciated that the function may be expanded to include additional properties such as polarity associated with events. In general, the digital coded exposure value associated with a given exposure function and summation method for a particular series is the sum of the values obtained by applying the exposure function to each event in the series.

As illustrated above, the function associated with the digital coded exposure 152 may be a sine function with varying frequency and phase parameters, with its values summed arithmetically, and where the event time-series are obtained from the pixels of the event-based imager module 110, e.g., a silicon retina event-based imager. It is appreciated that the entirety of each measured time series may be used to acquire one coded exposure value. As such, all event-streams from a single recording are transformed into one dense 2D matrix (frame) per exposure function. The value of the (x, y) th pixel of the coded exposure image for a matrix of event-streams captured from the silicon retina may be calculated using the equation below for various frequencies and phases.

$$\text{code}_{exp(x,y)} = \sum_{start\ time}^{end\ time} \sin(\text{event.timestamp} * \text{frequency} + \text{phase}) * \text{event.polarity}. \quad (1)$$

Generalization of equation (1) is shown below:

$$\text{Video}[n][x][y] = \sum_{e.timestamp=n*d}^{(n+1)*d} C(e.\text{timestamp}) * e.\text{polarity} \quad (2)$$

Where n is the index of the current frame, x is the horizontal index of the current pixel, y is the vertical index of the current pixel, d is the duration of the frame (e.g., in microseconds), C is the coded exposure/virtual shutter function, e is an event occurring at location (x,y) during interval [n*d, (n+1)*d), e.timestamp is the time of event e (e.g., in microseconds), and e.polarity is the polarity (e.g., +1 or −1) of the event e.

It is appreciated that for the embodiments and examples above, each possible sinusoidal irradiance excitation that interacts with the sensors, the events generated by the sinusoidal excitation (digital coded exposure 152) are multiplied with the virtual shutter function and integrated over the time period over which the frame is formed. Extension of the concept over all possible excitations is equivalent to considering the Fourier transform of the virtual shutter function/digital coded exposure. In one nonlimiting example, the function (shutter function) may be a temporal window function. It is appreciated that unlike the conventional physical shutter, the function of the digital coded exposure 152 may have a much larger range of values, e.g., complex values, real values, floating point values, etc. Moreover, as described above, digital coded exposure 152 enables multiple frames to be formed from a single set of event-driven imagery since it performed in post-processing 190. According to some embodiments, digital coded exposure 152 allows a tradeoff between frequency selectivity and sidelobe/spectral leakage characteristics by specifying the use of a variety of window functions, e.g., Blackman, Gaussian, Hann, Hamming, triangle, etc. As illustrated above, the function (shutter function) may be selected in an arbitrary manner to select a particular temporal pattern of interest, e.g., particular LED flashing at a particular frequency.

It is appreciated that the shutter function (also referred to as digital coded exposure) may be any function such as Morlet/Gabor wavelet that includes a complex exponential/sinusoidal carrier signal modulated by a Gaussian window envelope. It is appreciated that the dual nature of the Morlet wavelet allows tradeoffs between uncertainty in temporal and frequency resolution that may be used in a variety of signal processing applications. The Morlet wavelet w is shown below:

$$w = e^{2i\pi ft} e^{\frac{-t^2}{2\sigma^2}}. \quad (3)$$

In equation (3), i is the imaginary operator, f is the frequency (e.g., in Hz), and t is the time (e.g., in seconds) and σ is the width of the Gaussian as shown below:

$$\sigma = \frac{n}{2\pi f}. \quad (4)$$

An alternative expression for the Morlet wavelet is shown below:

$$w = e^{2i\pi ft} e^{\frac{-4ln(2)t^2}{h^2}} \quad (5)$$

where h is the full-width at half maximum in seconds of Gaussian window modulating the sinusoid.

It is appreciated that the Morlet wavelet may be applied as the digital coded exposure 152 function to event-driven imagery data (e.g., captured by the event-based imager module 110) using a point-wise multiplication, as shown in FIG. 3A. Referring now to FIG. 3B, magnitude of the Fourier transform of three Morlet wavelets with frequency responses of 100, 500, and 700 Hz is shown. It is appreciated that Morlet wavelets exhibit significant frequency selectivity, as shown, and therefore may be used as the function in the digitally exposure function to control the temporal frequency content that is allowed to contribute to the formation of the frame. It is appreciated that structure/width of the main lobe and side lobes provide insight into the frequency selectivity and sensitivity Morlet wavelet used as the function for digitally exposure function 152. It is appreciated that use of Morlet wavelet as the function in the digitally exposure function 152 is provided for illustration purposes only and should not be construed as limiting the scope of the embodiments.

Figure 4A:
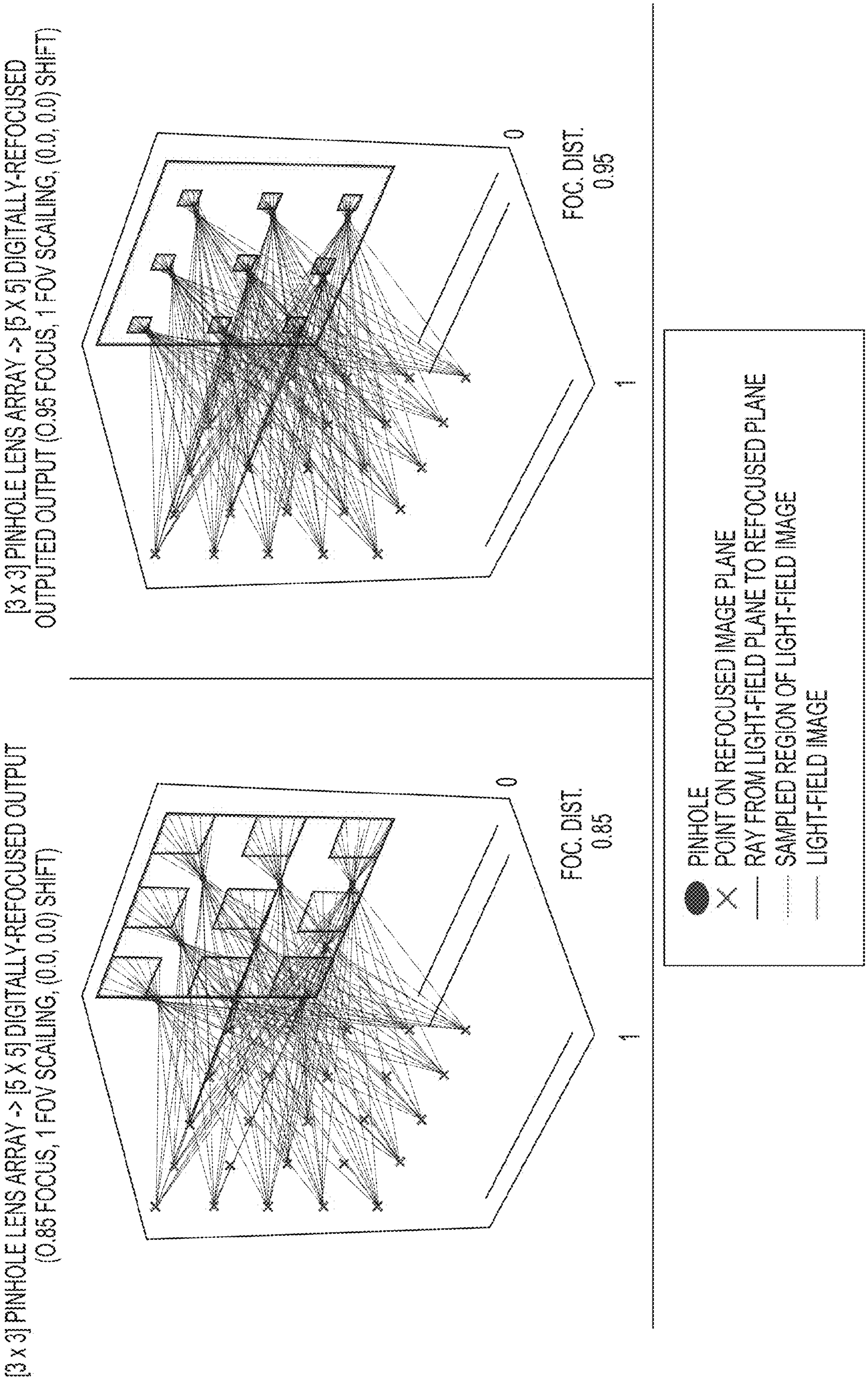
FIGS. 4A-4C depict examples of digitally refocusing and back-propagation algorithm according to one aspect of the present embodiments.
Figure 4B:
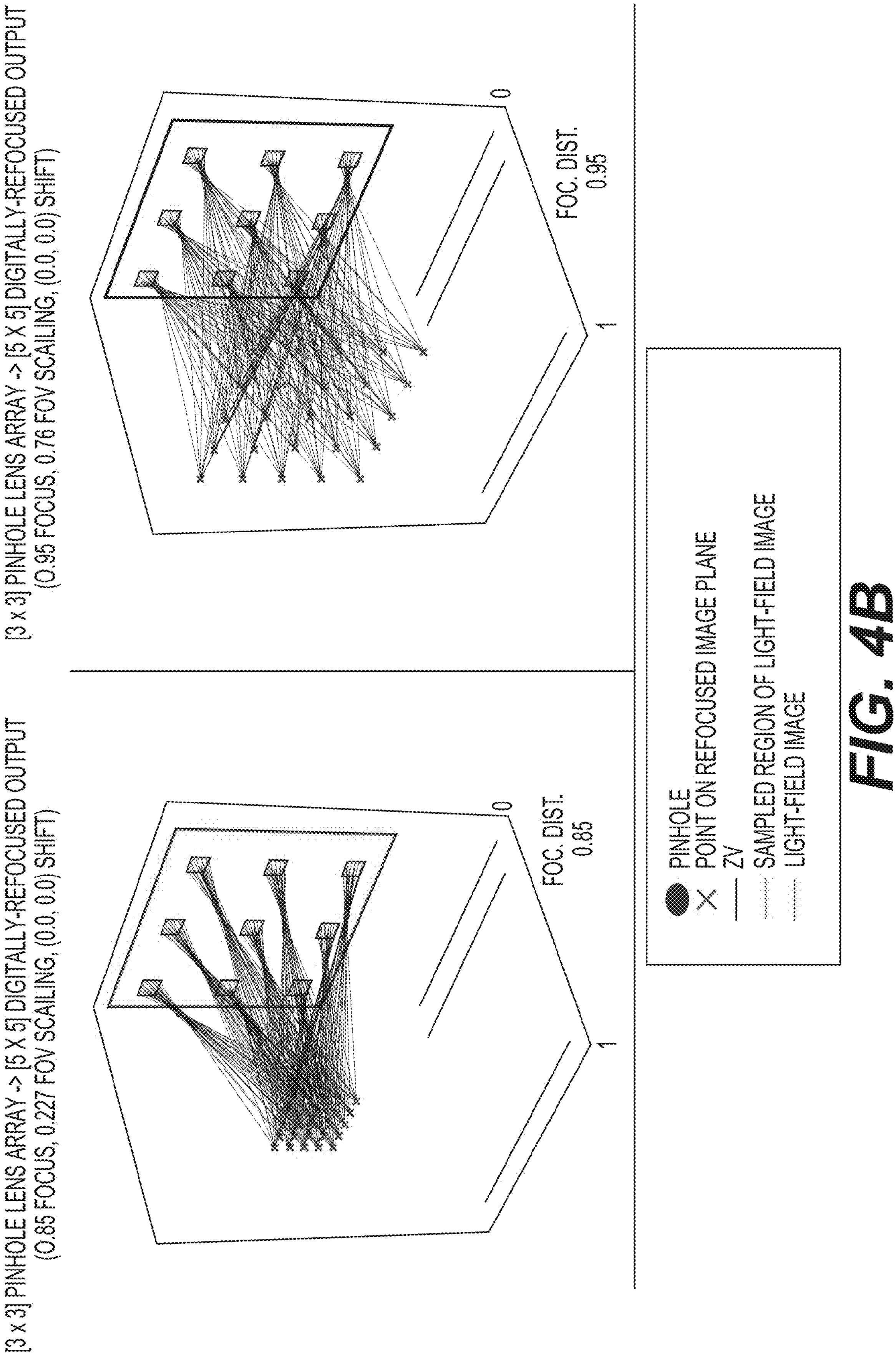
Figure 4C:
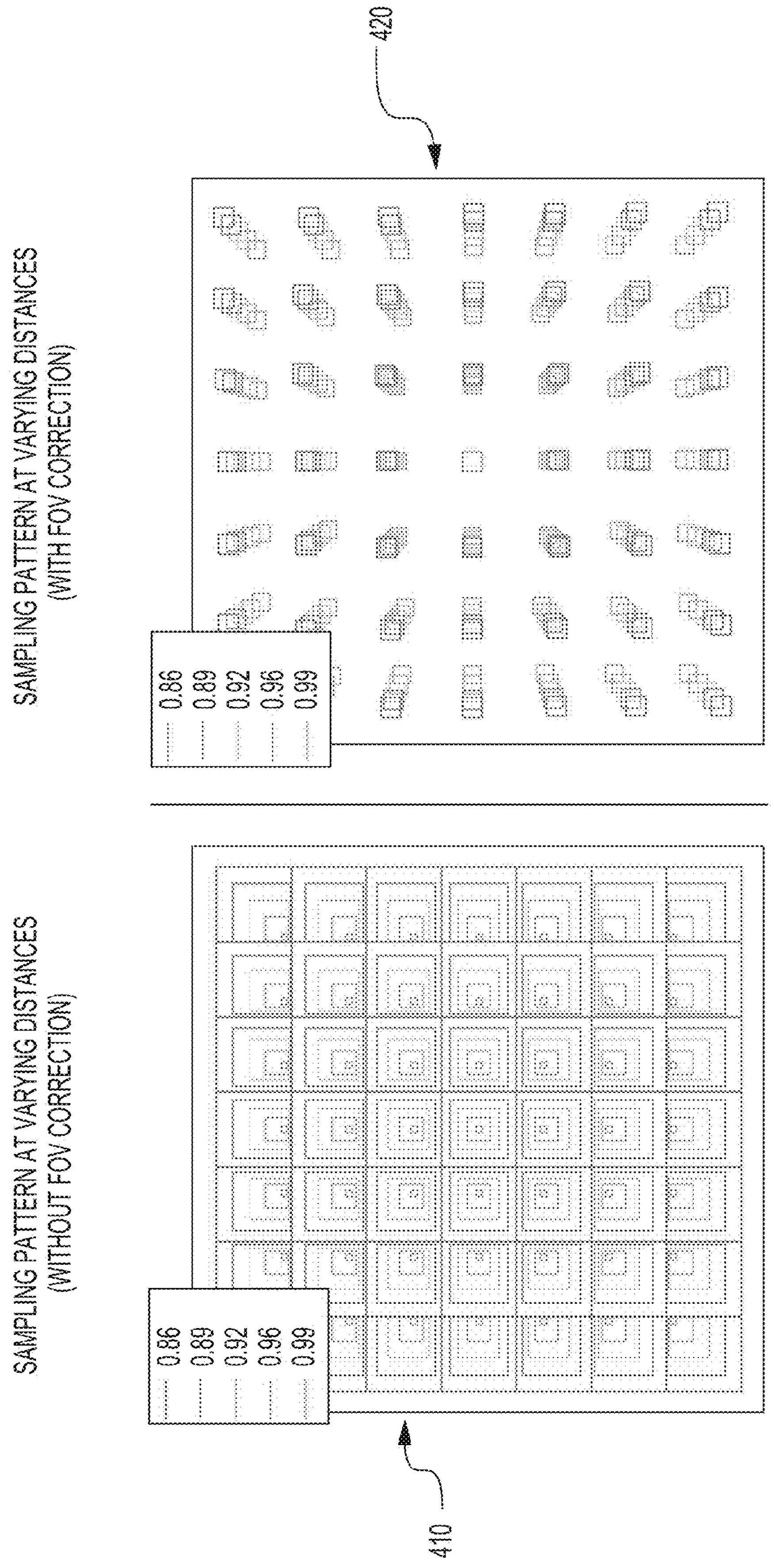

Referring now to FIGS. 4A-4C, plane-of-focus (refocusing/backpropagation) in accordance with some embodiments is shown. It is appreciated that digital refocusing is the process of transforming a light-field image (a photo taken through an array of micro-lenses) into a conventional image refocused at a particular distance in post-processing 190. According to some embodiments, digital refocusing may be achieved using sampling areas of each microlens' contributions (e.g., light field imager module 120) on the light-field image (e.g., light associated with object 130), and shift/summing these samples across all micro-lenses (microlens array). It is appreciated that a particular refocusing discussed here is for illustrative purposes and should not be construed as limiting the scope of the embodiments.

Back-propagation through a virtual array of P pinholes may be used to determine which areas of the micro-lenses should be sampled. For a point (x, y) on the refocused image plane, there may be P rays from the light-field image plane which each pass through a different pinhole to arrive at the point (x, y). The value at the point (x, y) on the refocused image plane may be the sum of the values of the light-field image plane at the origins of these P rays.

It is appreciated that the origin of these P rays changes depending on where the pinhole array sits between the refocused image plane and the light-field image plane, as shown in FIGS. 4A and 4B. In FIG. 4A, the paths of the rays from the light-field image plane to the refocused image plane using two different positions of the pinhole array is shown. For each position, 25 points on the refocused image plane is shown where 9 rays are passing through each of the 9 pinholes. It is appreciated that the rays' origin changes with the position of the pinhole array. In FIG. 4B, the size of the refocused image sensor is adjusted to keep the field of view of the refocused image constant.

According to some embodiments, the origin of the ray that starts on the light-field plane and passes through the nth pinhole to arrive at the point (x, y) on the refocused image may be calculated as:

$$\text{origin}_n(x, y) = (x, y) - \frac{((x - y) - (\text{pinhole}_n.x, \text{pinhole}_n.y))}{F} \tag{6}$$

where F is a scalar value ranging from (0,1) that may represent the position of the virtual pinhole array relative to the light field plane and refocused plane. It is appreciated that changing F changes the distance at which the digitally refocused image is focused. F is bound between 0 and 1 non-inclusive because as F approaches 0, the virtual pinhole array approaches the refocused plane and the rays passing through each pinhole must have come from points infinitely far apart on the light-field plane. Conversely, as F approaches 1, the virtual pinhole array approaches the light-field plane and rays passing through the same pinhole have the same origin on the light-field plane. The value of the refocused image at (x, y) is calculated as:

$$\text{refocused}_{image(x,y)} = \sum\nolimits_{n=0}^{P} \text{light\_field\_image}(\text{origin}_n(x, y)). \tag{7}$$

The sampling regions for each micro-lens at various focus values are shown in FIG. 4C for illustrative purposes. In this nonlimiting example, 49 micro-lenses (7×7) in the array are shown. As the focus ratio increases, the region of the micro-lens sampled (the field of view) decreases, as shown by 410, and the amplitude of the offset due to the position of the pinholes (the focused distance) increases and vice versa. It is appreciated that field of view changes may be eliminated by proportionally changing the size of the virtual sensor onto which the refocused image is projected, as shown by 420.

It is appreciated that an object in the refocused image appears in focus when its images are aligned across all the sampled regions of the microlenses it appears in, thereby reinforcing one another when the regions are summed. Conversely, objects where micro-lens images are misaligned appear blurry and dim because they do not overlap. Consequently, the effect of refocusing is more pronounced using arrays of micro-lenses with more lenses.

Figure 5:
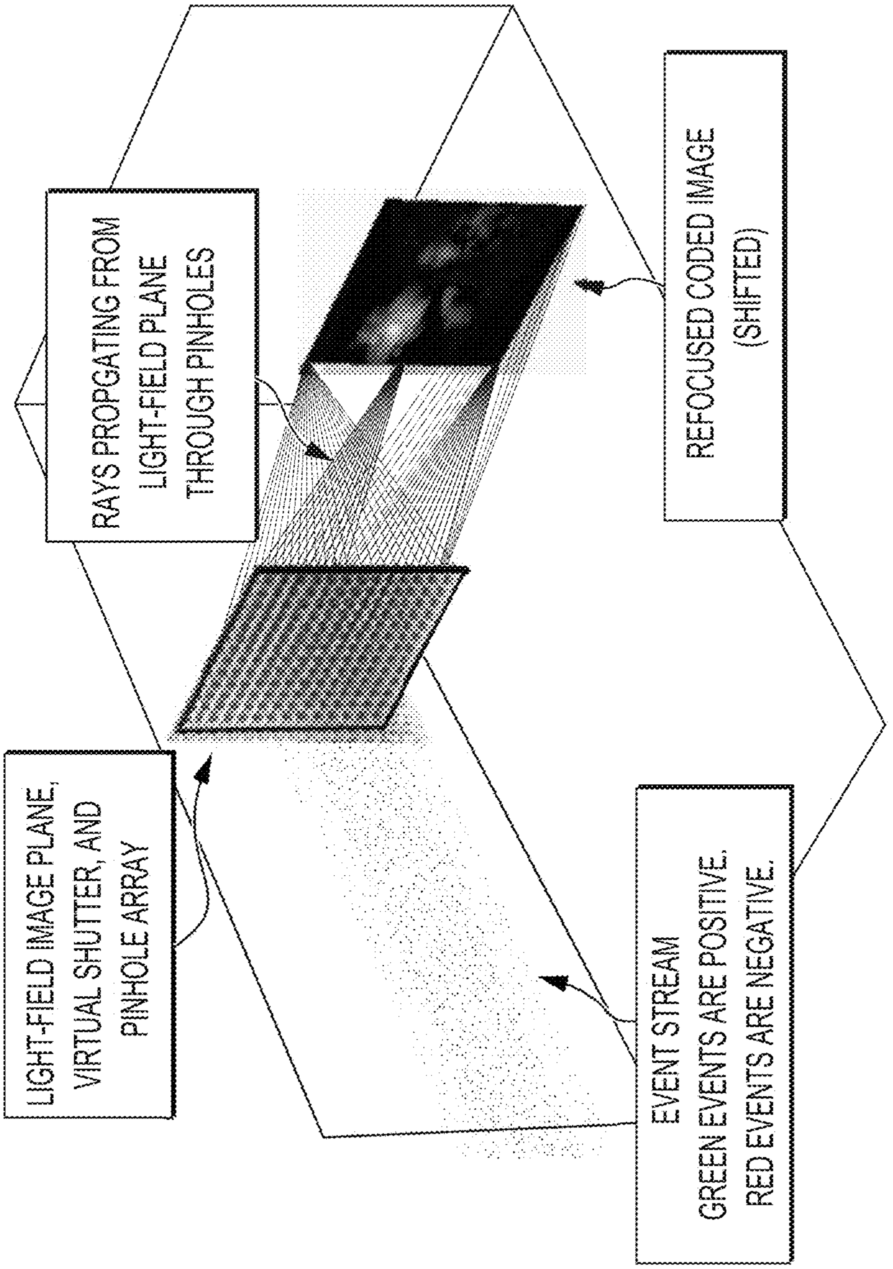
FIG. 5 depicts an example of refocusing and digitally re-exposing image according to one aspect of the present embodiments.

Referring now to FIG. 5, refocused and digital re-exposed image according to some embodiments is shown. It is appreciated that events stream in as recorded by event-based imager module 110. The event streams may consist of a combination of positive and negative polarity events in an example and may be represented by different colors. The events are filtered by a digital shutter to accumulate a light-field image where the light-field image is propagated through a pinhole array to the final refocused image. It is appreciated that the pinhole array has been shifted, thereby shifting the digital location of refocused coded image to ensure that LEDs are in the field of view.

As illustrated, a captured image may be modified to change its focus (focus in/out) as well as changing its exposure in post-processing 190, which in the conventional system was not possible.

Figure 6:
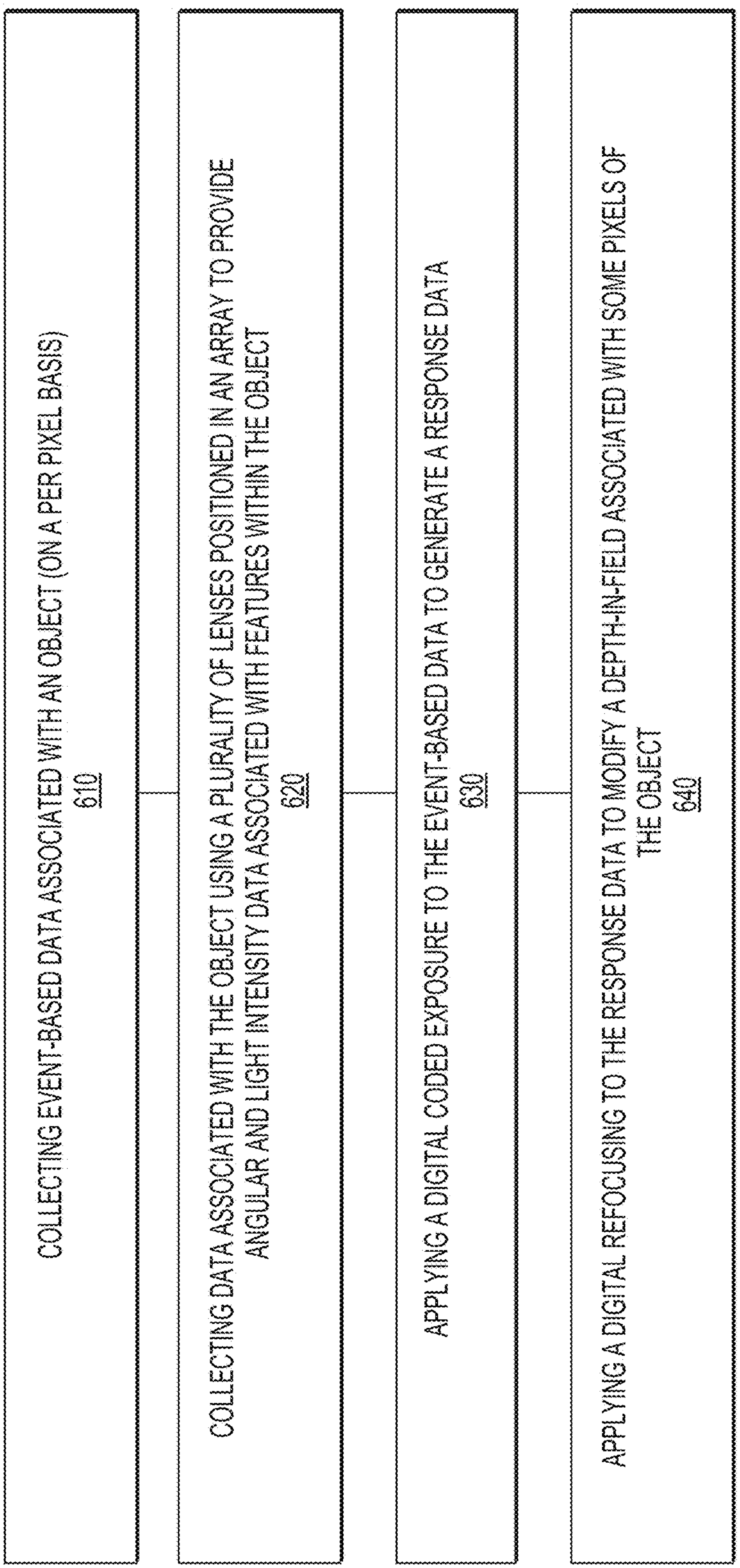
FIG. 6 depicts a flow diagram for modifying exposure time/function and refocusing of an image in post-processing according to one aspect of the present embodiments.

FIG. 6 depicts a flow diagram for modifying exposure time/function and refocusing an image post-processing according to some embodiments. At step 610, light associated with an object is collected using a plurality of lenses positioned in an array to provide angular and light intensity data associated with features within the object, as described above. At step 620, event-based data associated with an image is collected, as described above. The event-based data is associated with changes over time on a per pixel basis, as illustrated above. At step 630, a digital coded exposure is applied to the event-based data to generate a response data, as described above. It is appreciated that applying the digital coded exposure is based on a function that modifies one exposure time/function associated with one pixel of the image, as described above. At step 640, digital refocusing is applied to the response data to modify a depth-in-field associated with some pixels of the image.

As illustrated, the focus of features within an image can be modified after the image is captured, in post-processing, as well as modifying the exposure time/function, as described above. As discussed, the amount of memory usage may be reduced by using event-based imager, as described.

Figure 7:
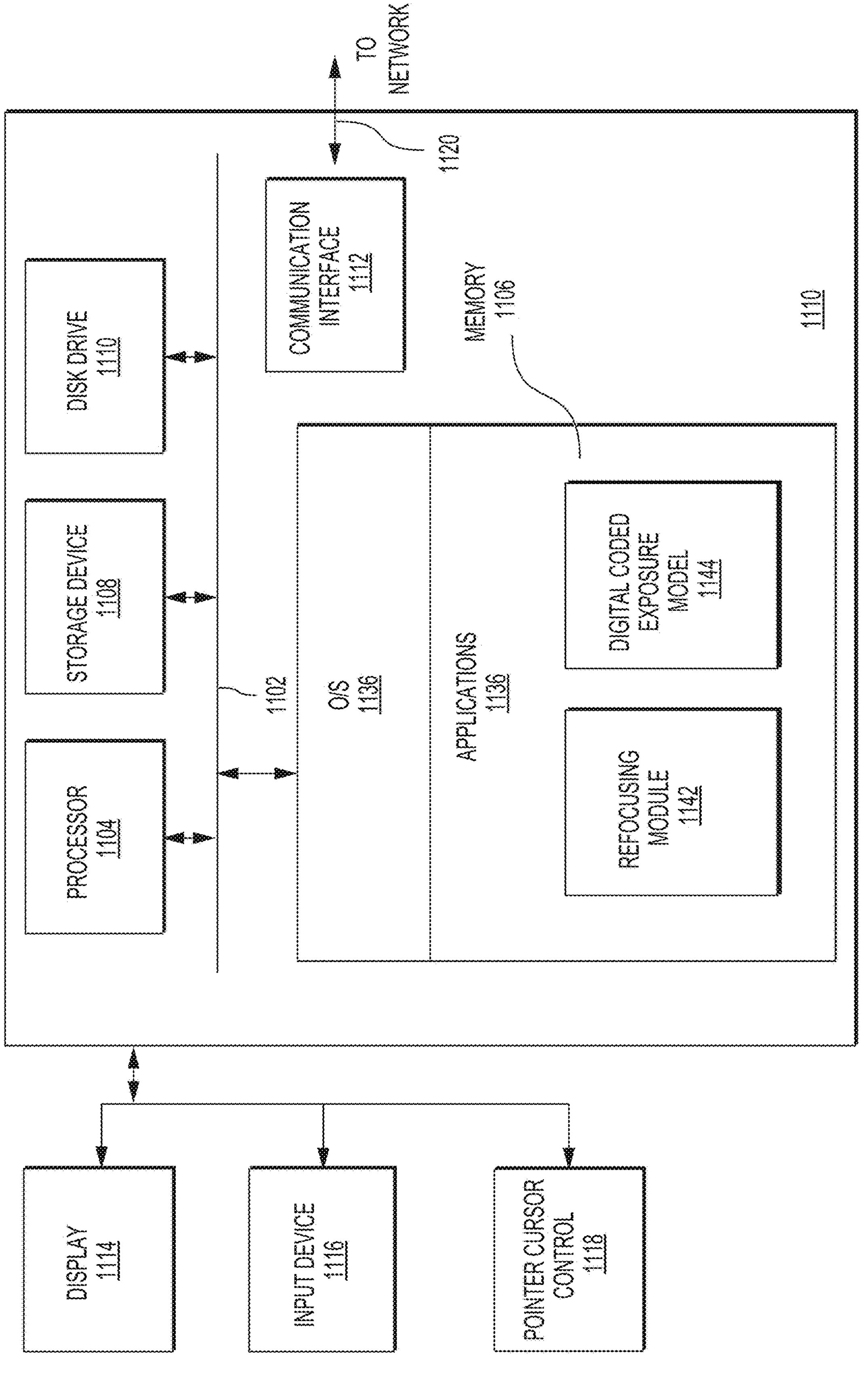
FIG. 7 depicts a block diagram of a computer system suitable for modifying exposure time/function and refocusing of an image in post-processing in accordance with some embodiments.

FIG. 7 depicts a block diagram of a computer system suitable for refocusing and modifying the exposure time/function after an image is captured and during post-processing in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wiredcircuitry can be used in place of or in combination with software instructions for implementation. In the example shown, system memory 1106 includes modules of executable instructions for implementing an operating system ("OS") 1132, applications 1136 (e.g., a host, server, web services-based, distributed (i.e., enterprise) application programming interface ("API"), program, procedure, or others). Applications 1136 includes a refocusing module 1142 that is configured to modify and change the focus of an image that has been captured already in post-processing, and a digital coded exposure module 1144 that is configured to modify the exposure time/function for an image that has been captured already, in post-processing, as described above. Communication interface 1112 is configured to send the one or more queries via communication link 1120 through a network to server configured to process data.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can be implemented in a distributed architecture including multiple systems 1100.

In some examples, execution of the sequences of instructions can be performed by a single computer system. According to some examples, two or more computer systems coupled by communication link (e.g., LAN, PSTN, or wireless network) can perform the sequence of instructions in coordination with one another. A computer system can transmit and receive messages, data, and instructions, including program code (i.e., application code) through communication link and communication interface. Received program code can be executed by a processor as it is received, and/or stored in a disk drive, or other non-volatile storage for later execution. In one embodiment, a system may be implemented as a hand-held device. But in other embodiments, a system can be implemented as a personal computer (i.e., a desktop computer) or any other computing device. In at least one embodiment, any of the above-described delivery systems can be implemented as a single system or can be implemented in a distributed architecture including multiple systems.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex.™., Fireworks. ®., Java.™., Javascript.™., AJAX, COBOL, Fortran, ADA, XML, HTML, DHTML, XHTML, HTTP, XMPP, and others. These can be varied and are not limited to the examples or descriptions provided.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the embodiments and their practical applications, thereby enabling others skilled in the relevant art to understand the claimed subject matter, the various embodiments and the various modifications that are suited to the particular use contemplated.

What is claimed is:

1. A method comprising:

collecting light associated with an object using a plurality of lenses positioned in an array to provide angular and light intensity data associated with features within the object, wherein the light from the object forms an image on a plurality of pixels;

collecting event-based data associated with the object, wherein the event-based data is associated with changes associated with the light from the object over time on a per pixel basis;

applying a digital coded exposure to the event-based data to generate a response data, wherein applying the digital coded exposure is based on a function that modifies one exposure characteristic associated with a subset of pixels from the plurality of pixels of the image; and applying digital refocusing to the response data to modify a depth-in-field associated with some pixels of the plurality of pixels.

2. The method of claim 1, wherein the digital coded exposure applies a function with a particular shape and a particular frequency.

3. The method of claim 1, wherein the digital coded exposure receives the event-based data and applies an exposure function to the event-based data, and wherein the digital coded exposure sums a plurality of responses associated with application of the exposure function to the event-based data.

4. The method of claim 1, wherein the digital coded exposure includes a Morlet wavelet function.

5. The method of claim 1, wherein the changes associated with the light from the object over time includes at least one or more of a brightness, a light intensity, position of the object, and color.

6. The method of claim 1 further comprising applying another digital coded exposure to the event-based data, wherein the another digital coded exposure modifies an another exposure characteristic associated with at least another subset of pixels of the plurality of pixels of the image.

7. The method of claim 6 further comprising forming at least two frames associated with the object, wherein a first frame has the one exposure characteristic associated with the digital coded exposure and wherein a second frame has the another exposure characteristic associated with the another digital coded exposure.

8. The method of claim 6 further comprising forming a re-exposed image for the object, wherein the re-exposed image has the one exposure characteristic for the subset of pixels from the plurality of pixels of the image and the another exposure characteristic for the at least the another subset of pixels of the plurality of pixels of the image.

9. The method of claim 1, wherein the applying the digital coded exposure occurs after the light from the object is captured.

10. The method of claim 1 further comprising capturing the angular and light intensity data using a plurality of apertures associated with an array.

11. The method of claim 1 further comprising capturing the angular and light intensity data by moving an aperture of an imager.

12. A system comprising:

an imager configured to capture light from an object, wherein the light from the object forms an image on a plurality of pixels, wherein the imager includes:

an event-based imager module configured to record event-based data associated with the object, wherein the event-based data is associated with changes associated with the light from the object over time on a per pixel basis;

a light field imager module configured to record angular and light intensity data from the object; and a processor configured to receive the event-based data and apply a digital coded exposure to generate a response data, wherein application of the digital coded exposure includes a function that modifies one exposure characteristic associated with a subset of pixels from the plurality of pixels of the image to form a modified image wherein the modified image includes the subset of pixels with one exposure characteristic that is different from an exposure characteristic of another subset of pixels of the plurality of pixels.

13. The system of claim 12, wherein the processor is further configured to apply digital refocusing to the response data to modify a plane-of-focus associated with some pixels of the plurality of pixels.

14. The system of claim 12, wherein the imager is a neuromorphic camera.

15. The system of claim 12, wherein the imager is an integral photography imager or a plenoptic camera.

16. The system of claim 12, wherein the digital coded exposure applies a function with a particular shape and a particular frequency.

17. The system of claim 12, wherein the digital coded exposure receives the event-based data and applies an exposure function to the event-based data, and wherein the digital coded exposure sums a plurality of responses associated with application of the exposure function to the event-based data.

18. The system of claim 12, wherein the digital coded exposure includes a Morlet wavelet function.

19. The system of claim 12, wherein the changes associated with the light from the object over time includes at least one or more of a brightness, a light intensity, position of the object, and color.

20. The system of claim 12, wherein the processor is further configured to apply another digital coded exposure to the event-based data, wherein the another digital coded exposure modifies an another exposure time associated with at least another subset of pixels of the plurality of pixels of the image.

21. The system of claim 20, wherein the processor is further configured to form at least two frames associated with the object, wherein a first frame has the one exposure time associated with the digital coded exposure and wherein a second frame has the another exposure time associated with the another digital coded exposure.

22. The system of claim 20, wherein the processor is further configured to form a re-exposed image for the image, wherein the re-exposed image has the one exposure time for the subset of pixels from the plurality of pixels of the image and the another exposure time for the at least the another subset of pixels of the plurality of pixels of the image.

23. The system of claim 12, wherein the digital coded exposure is applied after the light from the object is captured.

24. The system of claim 12, wherein the imager comprises an array of apertures that provide the angular and light intensity data.

25. The system of claim 12, wherein the imager comprises an aperture that moves, wherein the moving aperture provides the angular and light intensity data.

26. A system comprising:

a means for collecting data associated with light from an object wherein the data includes angular and light intensity data associated with features of the object, wherein the light from the object forms an image on a plurality of pixels;

a means for collecting event-based data associated with the object, wherein the event-based data is associated with changes associated with the light from the object over time on a per pixel basis;

a means for applying a digital coded exposure to the event-based data to generate a response data, wherein applying the digital coded exposure is based on a function that modifies one exposure time associated with a subset of pixels from the plurality of pixels of the image; and a means for applying digital refocusing to the response data to modify a depth-in-field associated with some pixels of the plurality of pixels.

* * * * *